United States Patent [19]

Hedblom et al.

[11] 4,104,256

[45] Aug. 1, 1978

[54] LOW PRESSURE ETHYLENE POLYMER BASED COMPOSITIONS

[75] Inventors: Mats-Olov Hedblom, Stenungsund; Sven Gilbert Sultan, Billingsfors, both of Sweden

[73] Assignee: Union Carbide Corporation, New York, N.Y.

[21] Appl. No.: 569,666

[22] Filed: Apr. 21, 1975

[30] Foreign Application Priority Data

Apr. 19, 1974 [SE] Sweden ................................. 7405343

[51] Int. Cl.² .............................................. C08K 5/53
[52] U.S. Cl. ...................... 260/45.95 D; 260/45.7 PH
[58] Field of Search ........ 260/45.7 PH, 953, 45.95 D; 252/325

[56] References Cited

U.S. PATENT DOCUMENTS

| | | | |
|---|---|---|---|
| 2,952,658 | 9/1960 | Pfeiffer | 260/45.7 P |
| 3,155,704 | 11/1964 | Knapp | 260/953 |
| 3,281,505 | 10/1966 | Spivack | 260/953 |
| 3,324,095 | 6/1967 | Carrick et al. | 526/127 |
| 3,324,101 | 6/1967 | Baker et al. | 526/126 |
| 3,493,538 | 2/1970 | Salyer | 260/45.7 P |

OTHER PUBLICATIONS

Industrial and Engineering Chemistry – Jul. 1956, pp. 1161–1164.

*Primary Examiner*—V. P. Hoke
*Attorney, Agent, or Firm*—Donald M. Papuga

[57] ABSTRACT

Compositions based on high molecular weight ethylene polymer made under low pressure conditions with supported chromium containing catalysts are stabilized against cross-linking during the compounding of such compositions by the use therein of certain phosphonic acids and the half esters of such acids.

17 Claims, No Drawings

LOW PRESSURE ETHYLENE POLYMER BASED COMPOSITIONS

BACKGROUND OF THE INVENTION

1. Field of the Invention

The present invention relates to an ethylene polymer based composition and more particularly to a low pressure ethylene polymer based composition having a decreased tendency to undergo an increase in the viscosity thereof during the hot, or melt, compounding thereof.

2. Description of the Prior Art

During the hot compounding of polyolefin resin based compositions, antioxidants are often added to inhibit the thermal oxidative degradation of the resin, which can cause a decrease in the viscosity of the composition.

During the hot compounding of low pressure polyethylene based compositions an increase in the viscosity of the composition sometimes occurs due to crosslinking between polymer molecules which leads to an increase of the average molecular weight of the polymer, and/or an increase of the high molecular weight tail fraction of the polymer. This increase in viscosity may lead to the need for additional energy requirements during the subsequent conversion of the composition into commercial articles, as for example, pipe, bottles, film, tape, profiles and blow molded and injected molded articles. The deleterious effects of such a viscosity increase, such as increased requirements for energy, mechanical degradation of the resin due to the use of higher shear forces, and a decrease in throughput through the compounding equipment could be limited to some extent by increasing the compounding temperature being employed. Such a temperature increase, however, is not entirely acceptable because it tends to lead to, for example, a tendency of the polymer to discolor, and the creation of bad odors. Further, additives that are commonly used in the polymer have a critical decomposition temperature which can not be exceeded and this also tends to limit an increase in the compounding temperature. In addition, there are limitations in the heating capacity of various types of the hot compounding equipment which can be employed.

The viscosity increase which can occur during the hot compounding of polyethylene resin based compositions tends to be much more severe when the resin employed is a high molecular weight low pressure polyethylene. The development of the use of low pressure polyethylene for new applications during recent years has focused on the use of the higher molecular weight polymers. Thus, since a viscosity increase during the hot compounding of the resin tends to become more severe for low pressure polyethylene resins having the higher molecular weights, the practical difficulties involved in hot compounding such resins have increased more and more.

For some high molecular weight resin based compounds it is thus impossible to readily incorporate additives therein by conventional hot compounding techniques. Instead, the method chosen to incorporate the additives is to dry blend them with the polymer at a temperature below the melting temperature of the polymer. This, however, among other things, tends to provide a nonhomogeneous distribution of the additive in the blended composition. Further, if such a dry blended low pressure polyethylene based composition is then converted to, for example, containers in blow molding equipment, the molecular weight of the resin in the finished container is much higher than that of the original polymer due to crosslinking of the polymer during the blow molding process.

Tests with conventional antioxidants and other known additives show that these materials provide little or no help in preventing an increase in viscosity of these compositions under these molding conditions. This can be interpreted to mean that the conventional antioxidants cannot stop the usual crosslinking reactions which are believed to be induced by the presence of free radicals.

SUMMARY OF THE INVENTION

In accordance with the teachings of the present invention, however, it has now been found that a viscosity increase in high molecular weight low pressure ethylene polymer resin based compositions can be effectively curtailed by adding certain phosphonic acid derivatives to these compositions. Thus, the present invention relates to high molecular weight low pressure ethylene polymer based compositions that contain certain alkylphosphonic acids or their monoalkylesters as melt viscosity stabilizers.

An object of the present invention is to provide melt viscosity stabilizers for high molecular weight ethylene polymer based compositions.

Another object of the present invention is to provide melt viscosity stabilizers for high molecular weight ethylene polymer based compositions wherein the polymer is one which has been made under relatively low pressure conditions with a chromium containing catalyst.

Another object of the present invention is to provide melt viscosity stabilizers for high molecular weight ethylene polymer based compositions which will enable the compositions to be readily processed, with little or no change in their melt viscosity characteristics, in conventional hot compounding equipment.

Another object of the present invention is to provide melt viscosity stabilizers for high molecular weight ethylene polymer based compositions which will enable all the additives of the compositions to be readily hot compounded together into pellet or granular form so that the compositions do not have to be used in a dry-blended powder form and thus suffer the disadvantages, i.e., low throughput rates, of attempting to process the powdery materials through blow molding and other types of melt fabricating equipment.

A further object of the present invention is to provide melt viscosity stabilizers for high molecular weight ethylene polymer based compositions which do not cause any, or any undue, discoloration of the polymer.

A further object of the present invention is to provide melt viscosity stabilizers for high molecular weight ethylene polymer based compositions which can be used effectively at relatively low concentrations and thus provide little or no migration of the stabilizer from the composition under the prevailing conditions of use.

A further object of the present invention is to provide melt viscosity stabilizers for high molecular weight ethylene polymer based compositions which can be readily synthesized.

These and other objects of the present invention are achieved by employing certain phosphonic acids, or derivatives thereof, as melt viscosity stabilizers in high molecular weight ethylene polymer compositions.

DESCRIPTION OF THE PREFERRED EMBODIMENT

The Ethylene Polymer Based Composition

The ethylene polymer based compositions of the present invention comprise, in parts by weight, 100 parts by weight of ethylene polymer, and melt viscosity stabilizing amounts of certain phosphonic acids, or monoesters thereof.

Ethylene Polymer

The ethylene polymers which are used in the compositions of the present invention are solid (at 25° C.) materials which may be homopolymers, or copolymers of ethylene which contain $\geq$ 80 mol % of interpolymerized ethylene, and $\leq$ 20 mol % of one or more other alpha olefins such as propylene, butene-1, pentene-1 and hexene-1. These ethylene polymers include low, medium and high density polymers having a density range (ASTM 1505 test procedure with conditioning as in ASTM D-1248-72) of about 0.88 to 0.96 and a melt index (ASTM D-1238 2.16 kg/cm² test pressure) of less than 1.0 grams/10 minutes and preferably of less than 0.5 grams/10 minutes. A melt index of 1.0 grams/10 minutes corresponds to a weight average molecular weight of more than 100,000.

The ethylene polymers are made under low pressure conditions of < 1000 psig, and preferably of about 150 to 350 psig with, preferably, supported chromium containing catalysts. These catalysts include the supported chromium oxide catalysts disclosed in U.S. Pat. No. 2,835,721 and the supported silyl chromate catalysts disclosed in U.S. Pat. No. 3,324,095 and 3,324,101. The catalysts comprise the support, the chromium compound, and, optionally, various types of modifiers. The polymers may be made under solution or slurry conditions as disclosed in U.S. Pat. No. 2,825,721; 3,324,095 and 3,324,101 or they may be made in a fluid bed process as disclosed in U.S. Pat. No. 3,790,036. The disclosures of these patents are incorporated herein by reference.

The polymers usually contain residual amounts of the supported chromium containing catalyst of the order of less than 10 parts per million, and preferably of the order of less than 3 to 4 parts per million, calculated as chromium metal. The polymers made with catalysts comprising the chromium oxide and silyl chromate compounds such as bis(triphenyl silyl)chromate are not completely saturated and have a terminal vinyl (unsaturated) group content of approximately one vinyl group per polymer molecule.

Phosphonic Acid Melt Viscosity Stabilizers

The phosphonic acid compounds used in the compositions of the present invention are alkyl phosphonic acids or monoalkylesters thereof which have the structure

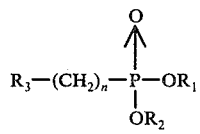

wherein $n$ is a whole number of 1 to 10 and each or $R_1$, $R_2$ and $R_3$ are selected from the group consisting of hydrogen, $C_1$ to $C_{30}$ branched or unbranched alkyl groups, and an aryl or benzyl group substituted with one OH group and one or two $C_1$ to $C_6$ alkyl groups.

A preferred group of the phosphonic acid compounds are those having the structure

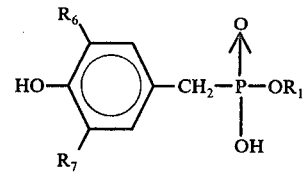

wherein $R_1$ is H or a $C_1$ to $C_{22}$ alkyl group and $R_6$ and $R_7$ are the same or different $C_1$ to $C_6$ alkyl groups. $R_6$ and $R_7$ are, preferably, each tertiary butyl groups.

The alkyl groups which can thus be used as substituent groups in the phosphonic acid compounds would include, methyl, ethyl, propyl, n-butyl, tertiary butyl, amyl, 2-ethylhexyl, lauryl, cetyl and stearyl groups.

The phosphonic acid compounds would thus include
O-ethyl-(4-hydroxy-3,5-di-tertiary butyl-benzyl) phosphonic acid,
O-(2-ethylhexyl)-(4-hydroxy-3,5-ditertiary butylbenzyl)phosphonic acid,
O-stearyl-(4-hydroxy-3,5-ditertiary butyl-benzyl)-phosphonic acid,
(4-hydroxy-3,5-ditertiary butyl-benzyl)phosphonic acid,
O-(4-hydroxy-3,5-di-tertiary butyl)-(4-hydroxy-3,5-ditertiary butyl-benzyl)phosphonic acid,
O-amyl-amyl-phosphonic acid, and
O-stearyl-stearyl-phosphonic acid.

The phosphonic acid compounds have previously been used as conventional antioxidants to prevent the thermal degradation of low molecular weight polyethylene, i.e., polyethylene having a melt index of greater than 1.0 gram/10 minutes. In the compositions of the present invention, however, it is believed that the phosphonic acid compounds function to prevent cross-linking of the polymer molecules. It is not known at this time whether the presence of chromium catalyst residues influences the activity of the phosphonic acid compounds.

The compositions of the present invention contain sufficient amounts of the phosphonic acid compound to achieve the desired melt viscosity stabilization effect. This amount is usually at least 0.001 weight percent, based on the weight of the entire composition. A precise upper limit on the concentration of the phosphonic acid compound is difficult to ascertain, due to the variations in the compositions that may be employed, i.e., variations with respect to the polymers themselves, contamination in the polymer, and adjuvants employed other than the phosphonic acid compounds. Variations in the process conditions under which the compositions are to be used may also require the use of various amounts of the phosphonic acid compounds. Very high concentrations of the phosphonic acid compounds, of the order of 5 to 25% by weight, can be present in so-called masterbatches of ethylene polymer and phosphonic acid compound which can be prepared for subsequent dilution with additional ethylene polymer. The preferable concentration of the phosphonic acid compound is about 0.005 to 0.5 weight percent, and most preferably 0.01 to 0.10 weight percent, based on the total weight of the composition.

Adjuvants

In addition to the ethylene polymer and the phosphonic acid compounds, the compositions of the present invention may also advantageously contain conventional additives, such as pigments, lubricants, antioxidants, UV stabilizers, peroxides and blowing agents. These adjuvants are used in amounts necessary to provide their intended effect.

The compositions of the present invention may also include minor amounts by weight, i.e., < 50%, of one or more resins which are compatible with the ethylene polymer of the present invention under the intended use conditions. These other resins would include homopolymers of ethylene and copolymers of ethylene with other alpha olefins which are made under low pressure (< 1000 psi) conditions but which have melt index values of ≧ 1.0 grams/10 minutes; polypropylene; and homopolymers of ethylene and copolymers of ethylene with other alpha olefins or with polymerizable vinyl esters such as ethyl acrylate, butyl acrylate and vinyl acetate which are made at high pressures (≧ 1000 psi), and usually with free radical catalysts.

Processing of the Compositions

The compositions of the present invention may be produced using conventional admixing procedures such as by incorporating the phosphonic acid compound, and other adjuvants as desired, into the ethylene polymer, which is in a powdery state in virgin form, by direct addition of the adjuvants to a melt of the ethylene polymer, or by a masterbatch addition in conventional compounding equipment such as continuous or discontinuous kneaders, and single or multiscrew extruders.

The following examples are merely illustrative of the present invention and are not intended as a limitation upon the scope thereof.

EXAMPLES

In the examples, percentages are given based on the weight of the ethylene polymer employed.

The ethylene polymers having melt indices of ≧ 0.1 grams/10 minutes which were used in these examples were homopolymers produced in a fluid bed process (as disclosed in U.S. Pat. No. 3,790,036) with a silica supported bis(triphenyl silyl)chromate catalyst at a pressure of about 200 psig.

In the Examples comparisons were made with the use of conventional additives identified as follows:

AO I: octadecyl-3(3',5'-di-tert.butyl-4'-hydroxyphenyl) propionate.
AO II: tetrakis-[methylen-3-(3',5'-di-tert.butyl-4'-hydroxyphenyl)propionate]-methane.
AO III: 4,4'-thiobis-(6-tert.butyl-m-cresol).
AO IV: N,N'-di-β-naphtyl-p-phenylendiamine.
AO V: 2,6-di-tert.butyl-para-cresol.
AO VI: calcium-bis (O-ethyl-3.5-di-tert.butyl-4-hydroxybenzylphosphonate).
AO VII: distearylpentaerytritol diphosphite.
AO VIII: trisnonylphenylphosphite.

EXAMPLE 1

Various ethylene polymers having different molecular weights as determined by melt index according to ASTM D-1238 (2.16 kg) were mixed with 0.05% AO I in a so called Banbury kneader at 210° C. melt temperature, after which the melt index once again was determined.

| a<br>Melt Index of polymer before mixing (g/10 min) | b<br>Melt Index of polymer after mixing (g/10 min) | c<br>Crosslinking factor (a/b) |
| --- | --- | --- |
| 11.0 | 11.0 | 1.0 |
| 7.7 | 7.0 | 1.1 |
| 1.0 | 0.5 | 2.0 |
| 0.5 | 0.1 | 5.0 |
| 0.1 | 0.01 | 10 |

This example shows that crosslinking under such mixing conditions is much more severe for the low pressure ethylene polymers of high molecular weight, that is, those having low melt index values, than for polymers having higher molecular weights.

EXAMPLE 2

Ethylene polymers produced in a fluidized bed and having a density of 954 kg/m³ and a melt index of 0.10 g/10 min were mixed with different commercially available antioxidants in a so called Banbury kneader at 210° C. melt temperature, after which the melt index values of the compositions were determined.

The results were as follows:

|  | Melt Index (g/10 min) |
| --- | --- |
| ethylene polymer without additive | <0.01 |
| ethylene polymer with 0.05% AO I | 0.01 |
| ethylene polymer with 0.05% AO II | 0.01 |
| ethylene polymer with 0.05% AO III | 0.02 |
| ethylene polymer with 0.05% AO IV | 0.02 |
| ethylene polymer with 0.05% AO V | 0.01 |

This Example shows that conventional antioxidants do not prevent a decrease in melt index to any higher degree for low pressure ethylene polymers having high molecular weights under the mixing conditions employed, than when no additive is used.

EXAMPLE 3

Various phosphorous containing antioxidants were mixed into the low pressure ethylene polymer according to the procedure of Example 2. The results were as follows:

|  | Melt Index (g/10 min) |
| --- | --- |
| ethylene polymer without additive | <0.01 |
| ethylene polymer with 0.05% AO VI | 0.01 |
| ethylene polymer with 0.05% AO VII | 0.02 |
| ethylene polymer with 0.05% AO VIII | 0.02 |

This Example shows that conventional phosphorous containing additives do not prevent a decrease in the melt index of the ethylene polymer to any greater extent either.

EXAMPLE 4

Using the procedure of Example 2, different phosphonic acid derivatives of the present invention were mixed into low pressure ethylene polymer. The results were as follows:

|  | Melt Index (g/10 min) |
| --- | --- |
| ethylene polymer without additive | <0.01 |
| ethylene polymer with 0.05% O-ethyl(3.5 di-terbutyl-4-hydroxybenzyl) phosphonic acid* | 0.08 |
| ethylene polymer with 0.05% 3.5 di-tert- | 0.09 |

| | Melt Index (g/10 min) |
|---|---|
| butyl-4-hydroxybenzyl phosphonic acid** | |

*phosphonic acid compound A.
**phosphonic acid compound B.

This Example shows that the phosphonic acid compounds of the present invention effectively prevent a decrease of the melt index of the ethylene polymer during the hot compounding thereof.

EXAMPLE 5

A mixture of phosphonic acid compound A (from Example 4) and antioxidant AO I were added to low pressure ethylene polymer according to the procedure of Example 2. The results were as follows:

| | Melt Index (g/10 min) |
|---|---|
| ethylene polymer without additive | <0.01 |
| ethylene polymer with 0.02% phosphonic acid compound A | 0.07 |
| ethylene polymer with 0.05% phosphonic acid compound A | 0.08 |
| ethylene polymer with 0.02% AO I | 0.01 |
| ethylene polymer with 0.05% AO I | 0.01 |
| ethylene polymer with a mixture of 0.05% phosphonic acid compound A and 0.05% AO I | 0.10 |

This Example shows that the phosphonic acid compounds of the present invention, in combination with conventional phenolic antioxidants, can effectively prevent a decrease in the melt index of ethylene polymer.

EXAMPLE 6

Various low pressure ethylene polymers having different melt indices were mixed with phosphonic acid compound A (from Example 4) instead of AO I in accordance with the procedure of Example 1. The results were as follows:

| a Melt Index before mixing (g/10 min) | b Melt Index after mixing (g/10 min) | c Crosslinking factor (a/b) |
|---|---|---|
| 11.0 | 11.0 | 1.0 |
| 7.7 | 7.7 | 1.0 |
| 1.0 | 0.9 | 1.1 |
| 0.5 | 0.45 | 1.1 |
| 0.1 | 0.08 | 1.25 |

This Example shows that phosphonic acid compound A provides a strong stabilizing effect, compared to AO I, on ethylene polymers having low melt index values (high molecular weights), while the effect on ethylene polymers having high melt index values is roughly the same with phosphonic acid compound A and antioxidant AO I, as seen in comparison with Example 1.

EXAMPLE 7

Phosphonic acid compound A was added to a mixture of 50% low pressure ethylene polymer (density 959 kg/m$^3$, melt index 0.10 g/10 min) and 50% high pressure polyethylene homopolymer (density 922 kg/m$^3$; melt index 0.5 g/10 min) according to the procedure of Example 2. The melt index of the admixture of the two polymers was 0. The results were as follows:

| | Melt Index (g/10 min.) |
|---|---|
| polymers without additive | 0.10 |
| polymers with 0.05% AO I | 0.20 |
| polymers with 0.05% phosphonic acid compound A | 0.28 |

This Example shows that the phosphonic acid compounds of the present invention also prevents a melt index decrease in a mixture of high molecular weight low pressure polyethylene with another polymer.

EXAMLE 8

Low pressure ethylene polymer powder (density 954 kg/m$^3$ and melt index 0.05 g/10 min) was dry blended with various additives. From these mixtures 60 liter containers were blow molded after which the melt index was determined on samples taken from the container. The results were as follows:

| | Melt Index (g/10 min) |
|---|---|
| blow molded sample without additives | <<0.01 |
| blow molded sample with 0.1% AO I | <<0.01 |
| blow molded sample with 0.1% phosphonic acid compound A | 0.03 |

This Example shows that the phosphonic acid compounds of the present invention effectively prevents a decrease in melt index during the blow molding of containers from dry blended high molecular weight low pressure ethylene polymer.

What is claimed is:

1. An ethylene polymer based composition comprising
    ehtylene polymer prepared by chromium containing catalyst having a melt index of less than 1.0 gram per 10 minutes, and a terminal vinyl group content of approximately one vinyl group per polymer molecule, and
    melt viscosity stabilizing amounts of at least one phosphonic acid compound which is an alkyl phosphonic acid or a monoalkyester thereof and having the structure

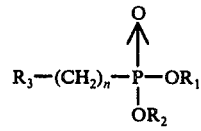

wherein $n$ is a whole number of 1 to 10, and each of $R_1$, $R_2$ and $R_3$ is selected from the group consisting of H, $C_1$ to $C_{30}$ alkyl groups and an aryl or benzyl group substituted with one OH group and one or two $C_1$ to $C_6$ alkyl groups,
with the proviso that at least one of $R_1$ and $R_2$ is H.

2. An ethylene polymer based composition as in claim 1 in which $R_1$ and $R_2$ are H.

3. An ethylene polymer based composition as in claim 1 in which $R_3$ is H.

4. An ethylene polymer based composition as in claim 3 in which the phosphonic acid compound has the structure

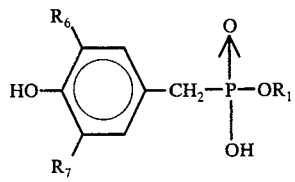

wherein $R_1$ is H or a $C_1$ to $C_{22}$ alkyl group and $R_6$ and $R_7$ are the same or different $C_1$ to $C_6$ alkyl groups.

5. An ethylene polymer based composition as in claim 4 in which $R_6 = R_7 =$ tertiary butyl.

6. An ethylene polymer based composition as in claim 5 in which said phosphonic acid compound is 3,5-ditertiarybutyl-4-hydroxybenzyl phosphonic acid.

7. An ethylene polymer based composition as in claim 5 in which said phosphonic acid compound is O-ethyl(3,5-ditertiarybutyl-4-hydroxybenzyl)phosphonic acid.

8. An ethylene polymer based composition as in claim 1 in which said ethylene polymer has a melt index of less than 0.5 gram per 10 minutes.

9. An ethylene polymer based composition as in claim 1 in which about 0.001 to 25 weight percent of said phosphonic acid compound is used in said composition.

10. An ethylene polymer based composition as in claim 9 in which about 0.005 to 0.5 weight percent of said phosphonic acid compound is used in said composition.

11. An ethylene polymer based composition as in claim 10 in which about 0.01 to 0.10 weight percent of said phosphonic acid compound is used in said composition.

12. An ethylene polymer based composition as in claim 1 in which said ethylene polymer is a homopolymer.

13. An ethylene polymer based composition as in claim 1 in which said ethylene polymer was prepared with a catalyst comprising silyl chromate or chromium oxide and contains residual amounts of chromium of the order of less than 10 parts per million.

14. An ethylene polymer based composition as in claim 13 in which said ethylene polymer was prepared with a catalyst comprising bis(triphenyl silyl)chromate.

15. An ethylene polymer based composition as in claim 14 which comprises, as said phosphonic acid compound, about 0.01 to 0.10 weight percent of at least one phosphonic acid compound selected from the group consisting of O-ethyl-(4-hydroxy-3,5-di-tertiary butyl-benzyl)phosponic acid, O-(2-ethylhexyl)-(4-hydroxy-3,5-ditertiary butyl-benzyl)phosphonic acid, O-stearyl-(4-hydroxy-3,5-ditertiary butyl-benzyl)-phosphonic acid, (4-hydroxy-3,5-ditertiary butyl-benzyl)phosphonic acid, O-(4-hydroxy-3,5-di-tertiary butyl-benzyl)-(4-hydroxy-3,5-ditertiary butyl-benzyl)phosphonic acid, O-amyl-amyl-phosphonic acid, and O-stearyl-stearyl-phosphonic acid.

16. A process for stabilizing the melt viscosity of ethylene polymer based compositions during the hot melt compounding or fabricating thereof where the ethylene polymer, prepared by chromium containing catalyst, has a melt index of less than 1.0 gram per 10 minutes, and a terminal vinyl group content of approximately one vinyl group per polymer molecule, which comprises admixing into said composition prior to said hot melt compounding or fabricating melt viscosity stabilizing quantities of at least one phosphonic acid compound which is an alkyl phosphonic acid or a monoalkylester thereof and having the structure

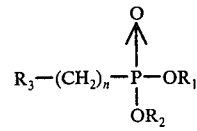

wherein $n$ is a whole number of 1 to 10, and each $R_1$, $R_2$ and $R_3$ is selected from the group consisting of H, $C_1$ to $C_{30}$ alkyl groups and an aryl or benzyl group substituted with one OH group and one or two $C_1$ to $C_6$ alkyl groups, with the proviso that at least one of $R_1$ and $R_2$ is H.

17. A process as in claim 16 in which at least about 0.001 weight percent of said phosphonic acid compound is employed based on the total weight of said composition.

* * * * *